United States Patent
Cromer et al.

(10) Patent No.: US 6,742,027 B1
(45) Date of Patent: May 25, 2004

(54) DATA PROCESSING SYSTEM AND METHOD FOR PERMITTING A SERVER TO REMOTELY DISABLE A CLIENT COMPUTER SYSTEM'S INPUT DEVICE

(75) Inventors: Daryl Carvis Cromer, Cary, NC (US); Richard Alan Dayan, Wake Forest, NC (US); Dhruv M. Desai, Cary, NC (US); Brandon Jon Ellison, Raleigh, NC (US); Eric Richard Kern, Durham, NC (US); Randall Scott Springfield, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/257,549

(22) Filed: Feb. 24, 1999

(51) Int. Cl.[7] .......................... G06F 15/16; G06F 13/00
(52) U.S. Cl. ..................... 709/223; 709/208; 709/250; 710/72
(58) Field of Search ................. 709/223, 226; 710/72, 107; 345/156, 158; 380/25

(56) References Cited

U.S. PATENT DOCUMENTS

| | | | | |
|---|---|---|---|---|
| 4,460,957 A | * | 7/1984 | Eggebrecht et al. | 710/72 |
| 5,359,660 A | * | 10/1994 | Clark et al. | 380/25 |
| 5,913,037 A | * | 6/1999 | Spofford et al. | 709/226 |
| 6,064,368 A | * | 5/2000 | Kang | 345/158 |
| 6,137,473 A | * | 10/2000 | Cortopassi et al. | 345/156 |
| 6,263,388 B1 | * | 7/2001 | Cromer et al. | 710/107 |
| 6,334,150 B1 | * | 12/2001 | Cromer et al. | 709/223 |

* cited by examiner

*Primary Examiner*—Glenton B. Burgess
*Assistant Examiner*—Kenneth Fields
(74) *Attorney, Agent, or Firm*—Bracewell & Patterson, LLP; Carlos Munoz-Bustamante

(57) ABSTRACT

A data processing system and method are described for permitting a server computer system to remotely disable an input device included within a client computer system coupled to the server utilizing a network. The server computer system transmits a message to the client computer system to disable the input device. In response to a receipt of the message, a network adapter included within the client computer system disables the input device by prohibiting a data stream output from the input device from being received by an input/output controller included within the client computer system.

9 Claims, 6 Drawing Sheets

DATA PROCESSING SYSTEM AND METHOD FOR PERMITTING A SERVER TO REMOTELY DISABLE A CLIENT COMPUTER SYSTEM'S INPUT DEVICE

BACKGROUND OF THE INVENTION

1. Field of the Invention

The present invention relates in general to data processing systems and, in particular, to a data processing system and method including a server and client computer systems coupled together utilizing a network. Still more particularly, the present invention relates to a data processing system and method including a server and client computer systems coupled together utilizing a network for permitting the server to remotely disable a client computer system's input device.

2. Description of the Related Art

Personal computer systems are well known in the art. They have attained widespread use for providing computer power to many segments of today's modern society. Personal computers (PCs) may be defined as a desktop, floor standing, or portable microcomputer that includes a system unit having a central processing unit (CPU) and associated volatile and non-volatile memory, including random access memory (RAM) and basic input/output system read only memory (BIOS ROM), a system monitor, a keyboard, one or more flexible diskette drives, a CD-ROM drive, a fixed disk storage drive (also known as a "hard drive"), a pointing device such as a mouse, and an optional network interface adapter. One of the distinguishing characteristics of these systems is the use of a motherboard or system planar to electrically connect these components together. Examples of such personal computer systems are IBM's PC 300 series, Aptiva series, and Intellistation series.

With PCs being increasingly connected into networks to allow transfers of data among computers to occur, more operations such as maintenance, updating of applications, and data collections are occurring over the network. Computer networks are also becoming essential to their users. It is desirable to minimize loss of productivity by increasing availability of network resources.

Remote management of client computer systems is becoming a part of both large and medium networks. Remote management provides tremendous cost of ownership advantages and provides better quality of service for a client. However, expanding the role of remotely managed computer systems also increases the complexity of managing the computer systems on the network.

Therefore a need exists for a data processing system and method for permitting a server computer system to remotely disable a client computer system's keyboard.

SUMMARY OF THE INVENTION

A data processing system and method are described for permitting a server computer system to remotely disable an input device included within a client computer system coupled to the server utilizing a network. The server computer system transmits a message to the client computer system to disable the input device. In response to a receipt of the message, a network adapter included within the client computer system disables the input device by prohibiting a data stream output from the input device from being received by an input/output controller included within the client computer system.

The above as well as additional objectives, features, and advantages of the present invention will become apparent in the following detailed written description.

BRIEF DESCRIPTION OF THE DRAWINGS

The novel features are set forth in the appended claims. The present invention itself, however, as well as a preferred mode of use, further objectives, and advantages thereof, will best be understood by reference to the following detailed description of a preferred embodiment when read in conjunction with the accompanying drawings, wherein:

DETAILED DESCRIPTION OF A PREFERRED EMBODIMENT

A preferred embodiment of the present invention and its advantages are better understood by referring to FIGS. 1–6 of the drawings, like numerals being used for like and corresponding parts of the accompanying drawings.

The present invention is a method and system for permitting a server computer system to remotely disable an input device, such as a keyboard or mouse, included within a client computer system coupled to the server utilizing a network. The server transmits a message to the client to disable the input device. In response to a receipt of this message, a service processor included within a network adapter in the client grounds the data output from the input device by pulling the voltage level to a logic level of zero. In this manner, the data output is not received by the input/output controller. For the purposes of this disclosure, "grounding" means pulling the voltage level of a signal to a logic level of zero.

The server may also re-enable the input device by transmitting a re-enable message to the client. In response to a receipt of the re-enable message, the service processor ceases grounding the data output. Therefore, the data output from the input device is again received by the input/output controller.

Figure 1:
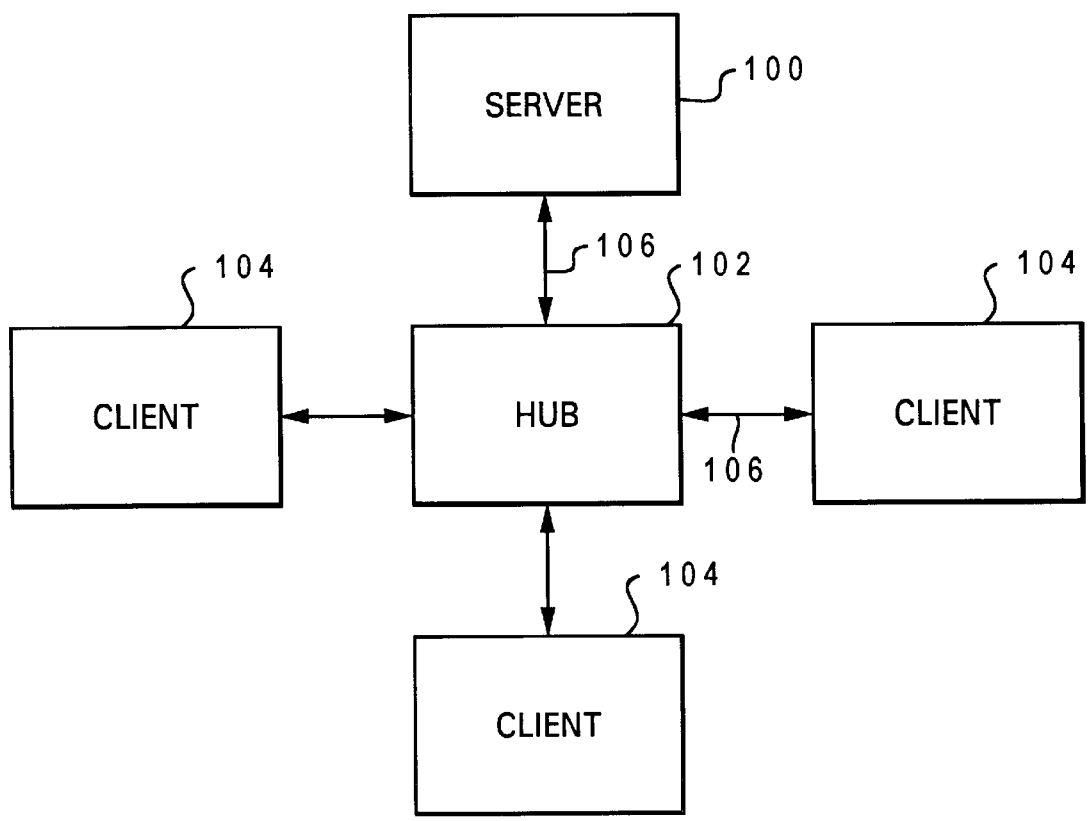
FIG. 1 illustrates a pictorial representation of a data processing system including a plurality of client computer systems coupled to a server computer system utilizing a network and a hub in accordance with the method and system of the present invention.

FIG. 1 illustrates a pictorial representation of a data processing system including a plurality of client computer systems 104 coupled to a server computer system 100 utilizing a hub 102 in accordance with the method and system of the present invention. Server computer system 100 is connected to a hub 102 utilizing a local area network (LAN) connector bus 106. Respective client systems 104 also connect to hub 102 through respective LAN busses 106. The preferred form of the network conforms to the Ethernet specification and uses such hubs. It will be appreciated, however, that other forms of networks may be utilized to implement the invention.

A "network" may include any type of data communications channel, such as an Ethernet network, token ring, X.10, or X.25. Those skilled in the art will recognize that the invention described herein may be implemented utilizing any type of data communications channel.

Figure 2:
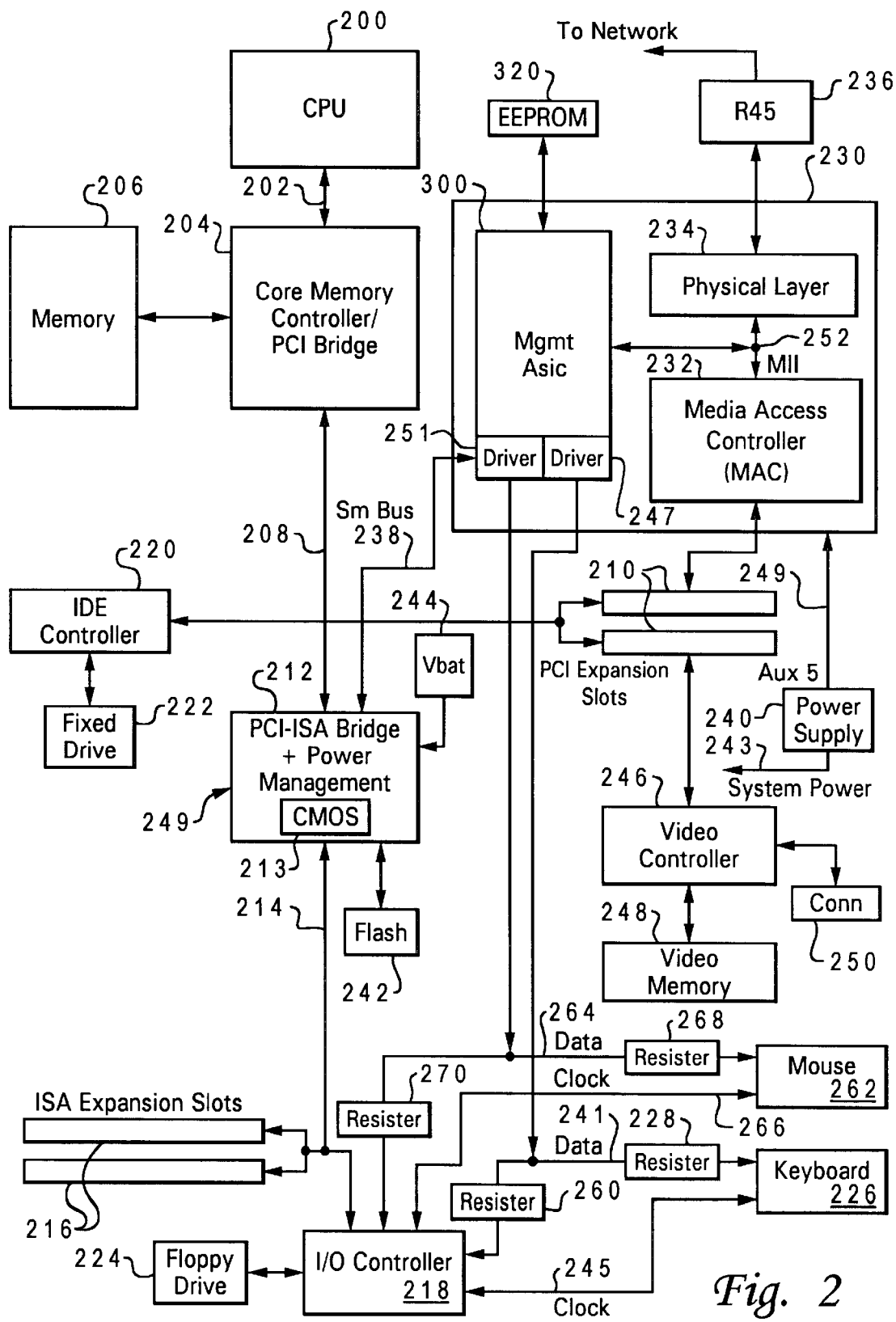
FIG. 2 depicts a pictorial representation of a processor and a network adapter included within a client computer system in accordance with the method and system of the present invention.

FIG. 2 illustrates a pictorial representation of a processor and a network adapter included within a client computer system in accordance with the method and system of the present invention. A central processing unit (CPU) 200 is connected by address, control, and data busses 202 to a memory controller and peripheral component interconnect (PCI) bus bridge 204 which is also coupled to system memory 206.

An integrated drive electronics (IDE) device controller 220 and a PCI bus to Industry Standard Architecture (ISA) bus bridge 212 are connected to PCI bus bridge 204 utilizing PCI bus 208. IDE controller 220 provides for the attachment of IDE compatible storage devices such as fixed disk drive 222. PCI/ISA bridge 212 provides an interface between PCI bus 208 and an optional feature or expansion bus such as the ISA bus 214. PCI/ISA bridge 212 includes power management logic. A PCI standard expansion bus with connector slots 210 is coupled to PCI bridge 204. PCI connector slots 210 may receive PCI bus compatible peripheral cards. An ISA standard expansion bus with connector slots 216 is connected to PCI/ISA bridge 212. ISA connector slots 216 may receive ISA compatible adapter cards (not shown). It will be appreciated that other expansion bus types may be used to permit expansion of the system with added devices. It should also be appreciated that two expansion busses are not required to implement the present invention.

PCI-ISA bridge controller 212 includes an interface for a flash memory 242, which includes microcode which client 104 executes upon power-on. Flash memory 242 is an electrically erasable programmable read only memory (EEPROM) module and includes BIOS that is used to interface between the I/O devices and operating system. PCI-ISA bridge controller 212 also includes CMOS storage 213 that holds initialization settings which represent system configuration data. Storage 213 includes values which describe the present configuration of client 104. For example, storage 213 includes information describing the list of initial program load (IPL) devices set by a user and the sequence to be used for a particular power method, the type of display, the amount of memory, time date, etc. Furthermore, this data is stored in storage 213 whenever a special configuration program, such as configuration/setup is executed. PCI-ISA bridge controller 212 is supplied power from battery 244 to prevent loss of configuration data in storage 213.

An I/O controller 218 is coupled to PCI-ISA bridge controller 212. I/O controller 218 controls communication between PCI-ISA bridge controller 212 and devices and peripherals such as floppy drive 224, keyboard 226, and mouse 262 so that these devices may communicate with CPU 200.

Keyboard 226 is coupled to I/O controller 218 utilizing a data line 241 through resistor 228 and resistor 260, and a clock line 245. Data is transmitted from/to keyboard 226 to/from I/O controller 218 utilizing data line 241. A clock is received by keyboard 226 from I/O controller 210 utilizing clock line 245.

Mouse 262 is coupled to I/O controller 218 utilizing a data line 264 through resistor 268 and resistor 270, and a clock line 266. Data is transmitted from/to mouse 262 to/from I/O controller 218 utilizing data line 264. A clock is received by mouse 262 from I/O controller 210 utilizing clock line 266.

An open collector output driver 247, which is designed to sink current, is included within ASIC 300 and is coupled to data line 241. ASIC 300 may ground data line 241 utilizing driver 247 by pulling data line 241 to a logical zero voltage level. When data line 241 is grounded, any data output from keyboard 226 on data line 241 is grounded, and thus, not received by I/O controller 210.

An open collector output driver 251, which is designed to sink current, is included within ASIC 300 and is coupled to data line 264. ASIC 300 may ground data line 264 utilizing driver 251 by pulling data line 264 to a logical zero voltage level. When data line 264 is grounded, any data output from mouse 262 on data line 264 is grounded, and thus, not received by I/O controller 210.

Client system 104 includes a video controller 246 which may, for example, be plugged into one of connector slots 210. Video controller 246 is connected to video memory 248. The image in video memory 248 is read by controller 246 and displayed on a monitor (not shown) which is connected to client 104 through connector 250.

A client system 104 includes a network adapter 230 which may, for example, be plugged into one of the PCI connector slots 210 (as illustrated) or one of the ISA connector slots 216 in order to permit client 104 to communicate with a LAN via connector 236 to hub 102.

Client computer system 104 includes a special power supply 240 which supplies full normal system power 243, and has an auxiliary power AUX 5 249 which supplies full time auxiliary power to the power management logic 212 and to network adapter 230. This enables client 104 to respond to a command to enable/disable either keyboard 226 or mouse 262. Client 104 will also respond to a wakeup signal from network adapter 230. In response to a receipt of the wakeup signal, full system power 243 from power supply 240 is turned on and then powers up client 104.

Network adapter 230 includes a physical layer 234 and a media access controller (MAC) 232 connected together utilizing a Media Independent Interface (MII) bus 252. The MII bus 252 is a specification of signals and protocols which define the interfacing of a 10/100 Mbps Ethernet Media Access Controller (MAC) 232 to the underlying physical layer 234.

MAC 232 processes digital network signals, and serves as an interface between a shared data path, i.e. the MII bus 252, and the PCI bus 208. MAC 232 performs a number of functions in the transmission and reception of data packets.

For example, during the transmission of data, MAC 232 assembles the data to be transmitted into a packet with address and error detection fields. Conversely, during the reception of a packet, MAC 232 disassembles the packet and performs address checking and error detection. In addition, MAC 232 typically performs encoding/decoding of digital signals transmitted over the shared path and performs preamble generation/removal, as well as bit transmission/reception. In a preferred embodiment, MAC 232 is an Intel 82557 chip. However, those skilled in the art will recognize that the functional blocks depicted in network adapter 230 may be manufactured utilizing a single piece of silicon.

Physical layer 234 conditions analog signals to go out to the network via an R45 connector 236. Physical layer 234 may be a fully integrated device supporting 10 and 100 Mb/s CSMA/CD Ethernet applications. Physical layer 234 receives parallel data from the MII local bus 252 and converts it to serial data for transmission through connector 236 and over the network. Physical layer 234 is also responsible for wave shaping and provides analog voltages to the network. In a preferred embodiment, physical layer 234 is implemented utilizing an Integrated Services chip ICS-1890.

Physical layer 234 includes auto-negotiation logic that serves three primary purposes. First, it determines the capabilities of client computer 104. Second, it advertises its own capabilities to server computer 100. Third, it establishes a connection with server computer 100 using the highest performance connection technology.

Network adapter 230 includes a special purpose processing unit 300 coupled to the MII bus 252 between physical layer 234 and MAC 232. Logic module 300 may be a "hard wired" application specific integrated circuit (ASIC) or a programmed general-purpose processor which is programmed as more fully described below. By coupling ASIC 300 to the MII bus 252, ASIC 300 may send and receive network packets using physical layer 234.

Data from client computer system 104 is accessed by ASIC 300 over a system management bus (SM) 238. System management bus 238 is a two-wire low speed serial bus used to connect system management devices. This provides a path to allow software running on client 104 to access ASIC 300. With the trickle power supplied by signal AUX 5 249 from power supply 240, ASIC 300 is preferably powered full time.

Figure 3:
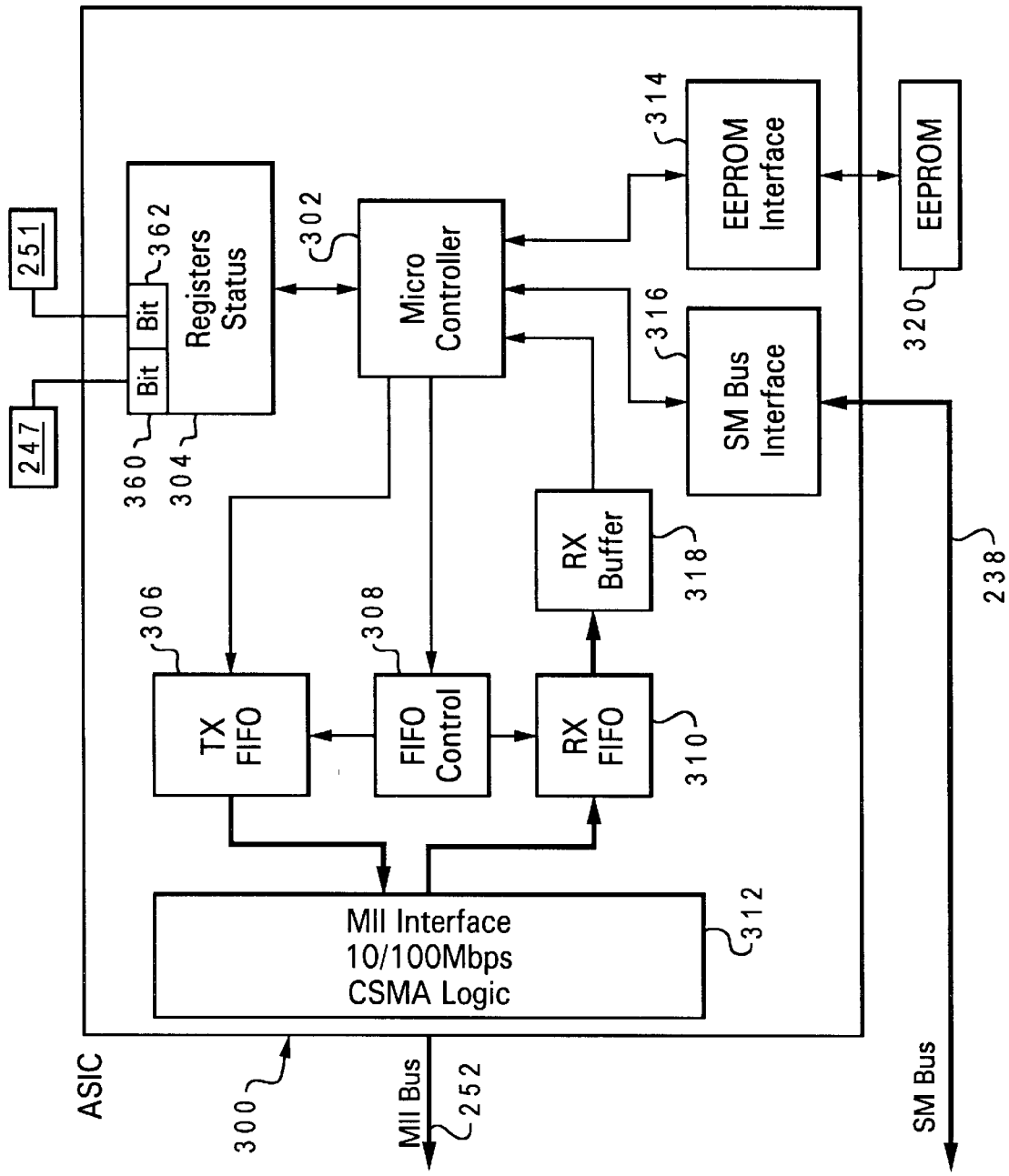
FIG. 3 illustrates a pictorial representation of a special purpose processing unit included within a network adapter in accordance with the method and system of the present invention.

FIG. 3 illustrates a pictorial representation of a special purpose processing unit included within network adapter 230 in accordance with the method and system of the present invention. Special purpose processing unit is implemented utilizing ASIC 300 which includes a micro-controller 302 which includes several state machines to handle the following tasks: packet reception, SM bus interface, and EEPROM updates. Micro-controller 302 sends commands to FIFO control 308 to control data flow from TX FIFO 306, RX FIFO 310, and RX Buffer 318. Micro-controller 302 also responds to SM bus 238 requests utilizing SM bus interface 316 from software running on client 104 to access register status 304. Micro-controller 302 may access EEPROM 320 utilizing an EEPROM interface 314. Signals are received from the MII bus 252 by interface unit 312 and passed to RX FIFO 310.

Registers/status 304 includes a bit 360 coupled to driver 247, and a bit 362 coupled to driver 251. Bit 360 is utilized to cause driver 247 to ground data line 241. Bit 362 is utilized to cause driver 251 to ground data line 264.

Figure 4:
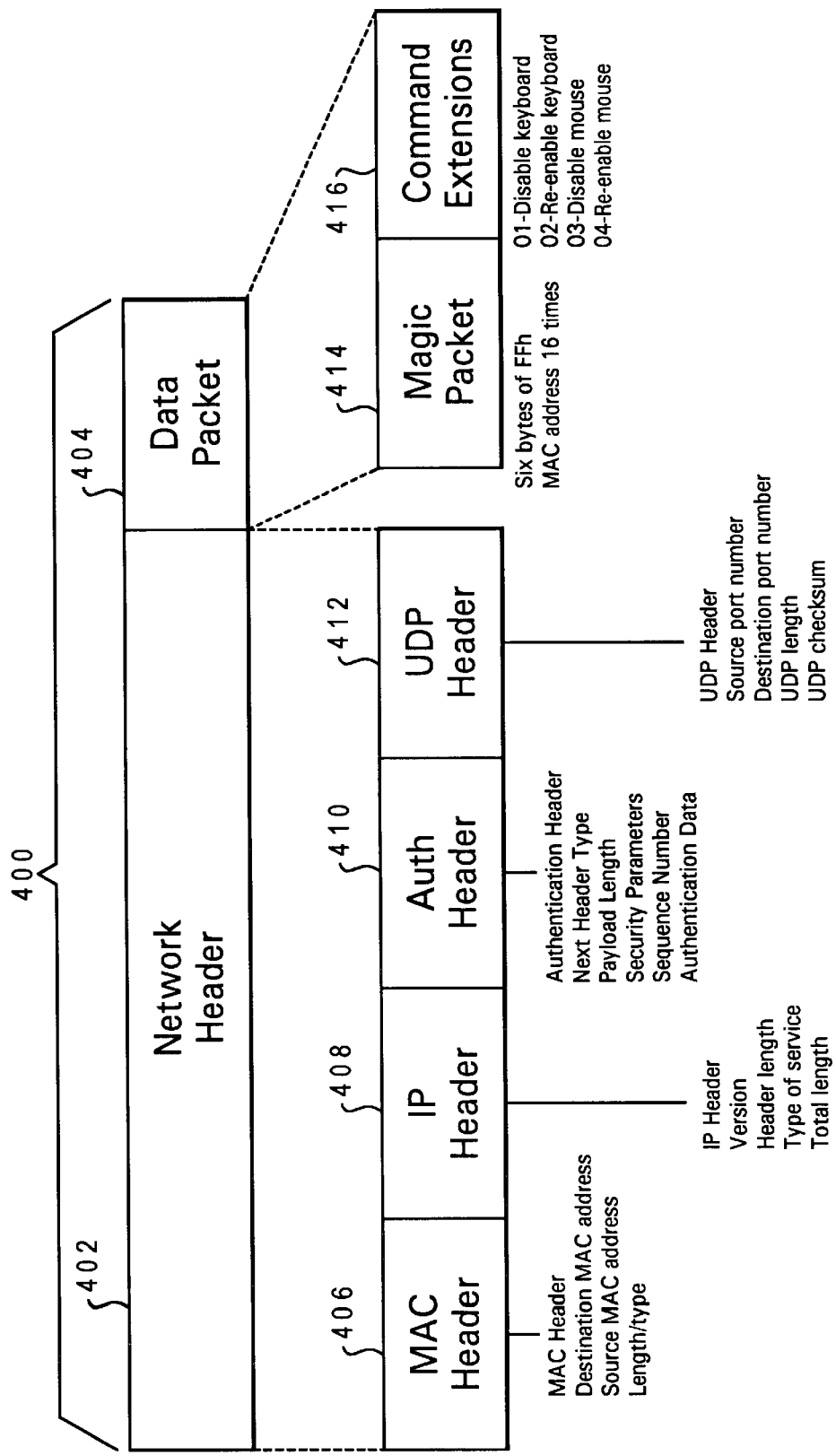
FIG. 4 illustrates a pictorial representation of a network packet, including a network header and a data packet, which may be transmitted by a server computer system over the network in accordance with the method and system of the present invention.

FIG. 4 illustrates a pictorial representation of a network packet 400, including a network header 402 and a data packet 404, which may be transmitted by a server computer system over the network in accordance with the method and system of the present invention. Each network packet 400 includes a network header 402 and a data packet 404.

Network header 402 includes a MAC header 406, IP header 408, authentication header 410, and UDP header 412 which are all known in the art to provide addresses, identifiers, and other information for assuring correct transfer of the packet. Data packet 404 includes the information content to be transferred.

Data packet 404 includes a magic packet 414 and command extensions 416. The content of Magic packet 414 is six bytes of "FF" followed by 12 copies of client MAC addresses. Magic packet 414 is a specialized type of packet. Magic packet 414 is a management packet which does not include standard network data. When magic packet 414 is detected utilizing the six bytes of "FF", MAC 232 will ignore magic packet 414.

Data packet 404 also includes command extensions 416. Server computer system 100 may specify one of a plurality of command extensions in data packet 404 in order to remotely disable/re-enable keyboard 226 or mouse 262. For example, the command extension may be a disable keyboard, re-enable keyboard, disable mouse, or re-enable mouse command.

When a network packet 400 is received by client 104, it is received by physical layer 234 and placed on the MII bus 252. When network packet 400 includes magic packet 414, MAC 232 detects that it includes magic packet 414, and then MAC 232 ignores the network packet 400, including magic packet 414 and command extensions 416. When magic packet 414 is included, ASIC 300 processes network packet 400, including command extensions 416.

ASIC 300 receives network packet 400 utilizing the MII interface 252. Data packet 404 is transferred to RX FIFO 310 and then to RX buffer 318. Micro-controller 302 then inspects data packet 404 and determines which command extensions 416 are included. The appropriate function is executed in accordance with the description which follows.

Figure 5:
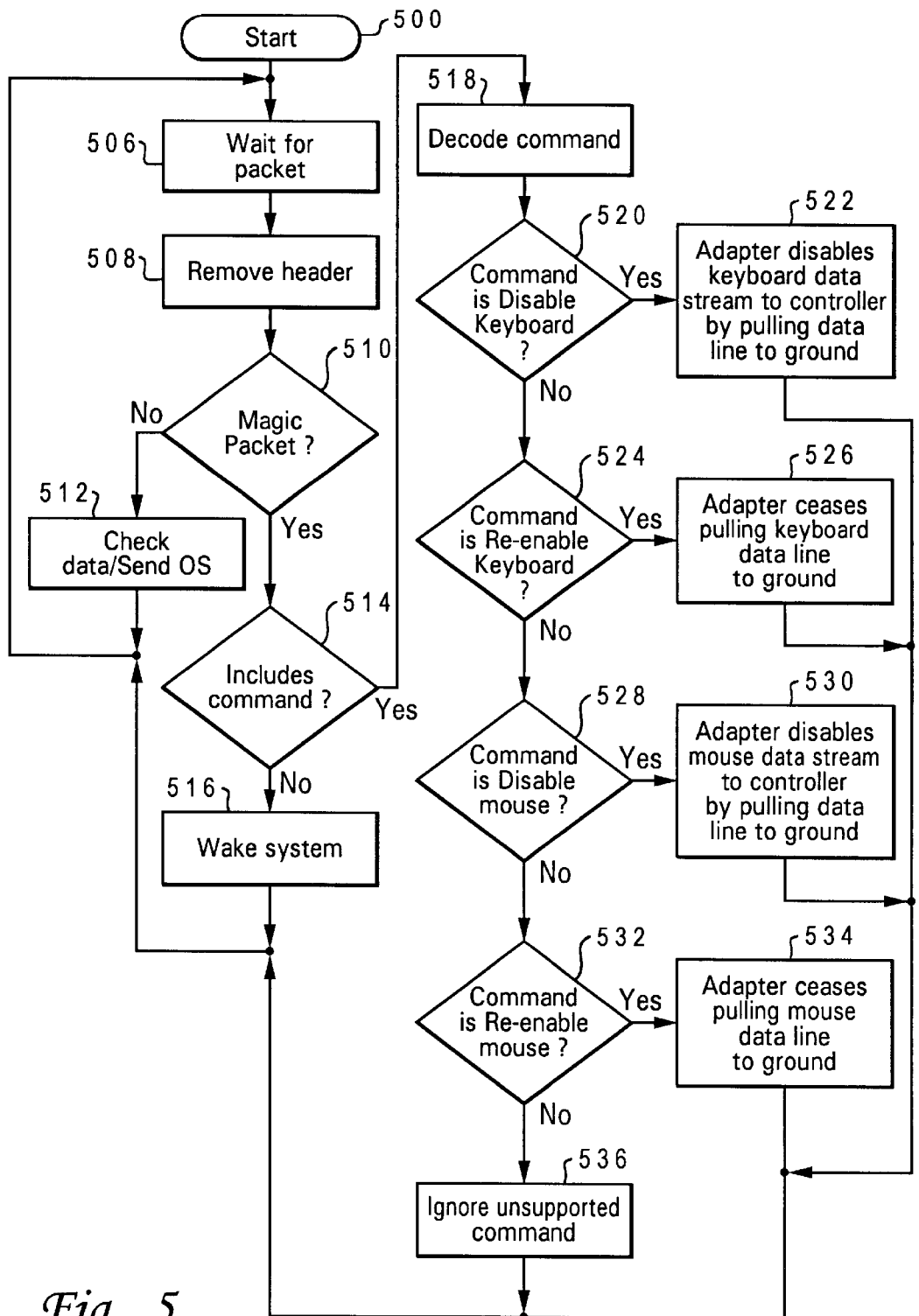
FIG. 5 depicts a high level flow chart which illustrates a client computer system disabling and re-enabling the client's keyboard or mouse in accordance with the method and system of the present invention.

FIG. 5 depicts a high level flow chart which illustrates a client computer system disabling/re-enabling the client's keyboard or mouse in accordance with the method and system of the present invention. The process starts as depicted by block 500 and thereafter passes to block 506 which illustrates a micro-controller 302 included within client computer system 104 waiting to receive network packet 400. When the packet has been received, physical layer 234 places data packet 404 included within network packet 400 on the MII bus 252. The MII bus 252 is read by MII interface 312 of ASIC 300. ASIC 300 transfers data packet 404 from MII interface 312 to RX FIFO 310 and to RX buffer 318.

The process then passes to block.508 which depicts micro-controller 302 removing network header 402 from the packet. Next, block 510 illustrates a determination by micro-controller 302 of whether or not data packet 404 included magic packet 414. If a determination is made that data packet 404 did not include magic packet 414, the process passes to block 512 which depicts the data included within data packet 404 being sent to the operating system (OS). The process then passes back to block 506.

Referring again to block 510, if a determination is made that data packet 404 did include magic packet 414, the process passes to block 514 which illustrates a determination of whether or not data packet 404 also included additional commands 416. If a determination is made that data packet 404 does not include any additional commands 416, the process passes to block 516 which depicts the transmission of a wakeup command which will cause the client to power-up. The process then passes back to block 506.

Referring again to block 514, if a determination is made that data packet 404 does include additional commands 416, the process passes to block 518 which depicts the decoding of the additional commands 416. Next, block 520 illustrates a determination of whether or not the command is a disable keyboard command. If a determination is made that the command is a disable keyboard command, the process passes to block 522 which illustrates ASIC 300 within network adapter 230 disabling the data stream to the controller by pulling data line 241 to ground. The process then passes back to block 506.

Referring again to block 520, if a determination is made that the command is not a disable keyboard command, the process passes to block 524 which depicts a determination of whether or not the command is re-enable keyboard command. If a determination is made that the command is a re-enable keyboard command, the process passes to block 526 which illustrates ASIC 300 within adapter 230 ceasing pulling data line 241 to ground. The process then passes back to block 506. Referring again to block 524, if a determination is made that the command is not a re-enable keyboard command, the process passes to block 528 which illustrates a determination of whether or not the command is a disable mouse command. If a determination is made that the command is a disable mouse command, the process passes to block 530 which illustrates ASIC 300 within network adapter 230 disabling the data stream to the controller by pulling data line 264 to ground. The process then passes back to block 506.

Referring again to block 528, if a determination is made that the command is not a disable mouse command, the process passes to block 532 which depicts a determination of whether or not the command is re-enable mouse command. If a determination is made that the command is a re-enable mouse command, the process passes to block 534 which illustrates ASIC 300 within adapter 230 ceasing pulling data line 264 to ground. The process then passes back to block 506. Referring again to block 532, if a determination is made that the command is not a re-enable mouse command, the process passes to block 536 which depicts ignoring the unsupported command. The process then passes back to block 506.

Figure 6:
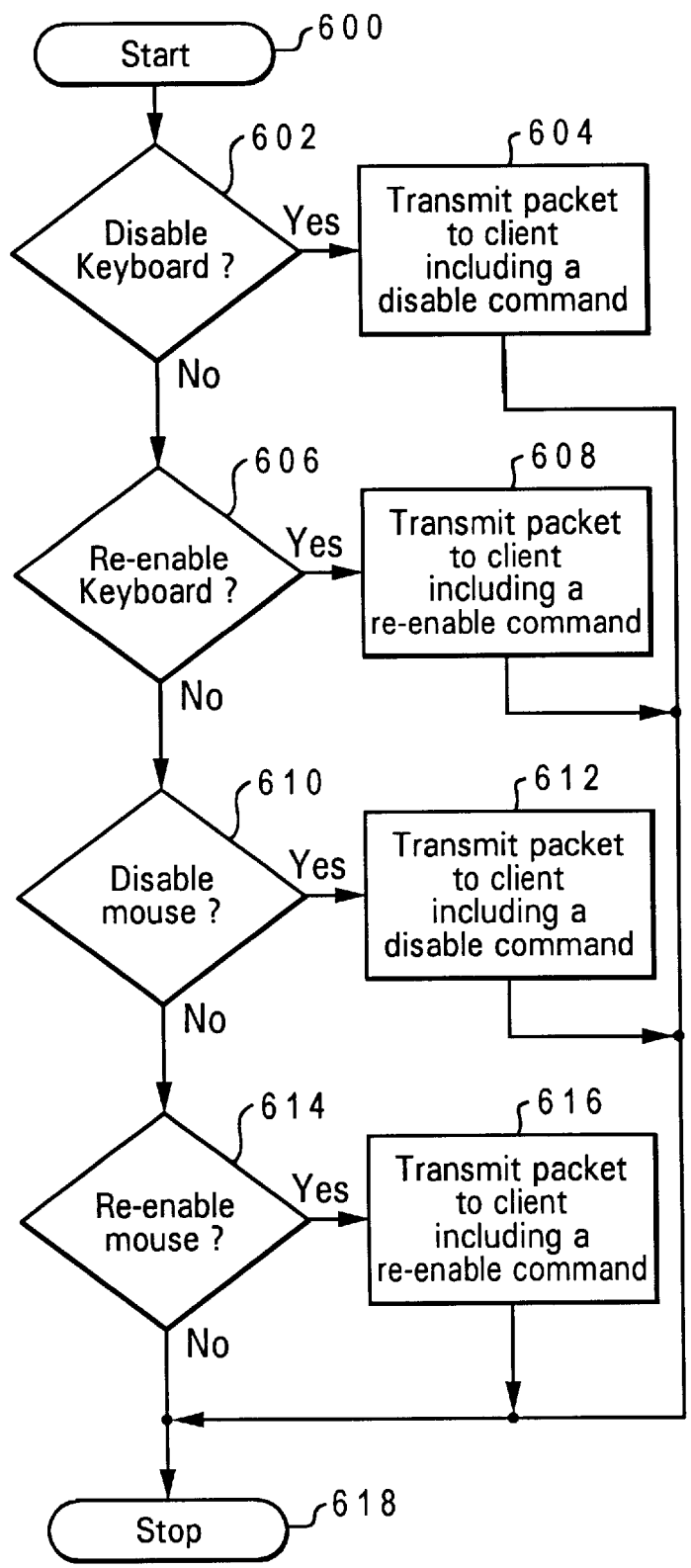
FIG. 6 illustrates a high level flow chart which depicts a server computer system transmitting a command to disable/re-enable a client's keyboard or mouse in accordance with the method and system of the present invention.

FIG. 6 illustrates a high level flow chart which depicts a server computer system transmitting a command to disable/re-enable a client's keyboard or mouse in accordance with the method and system of the present invention. The process starts as depicted at block 600 and thereafter passes to block 602 which illustrates a determination of whether or not the server computer system is to disable the keyboard of a particular client on the network. If a determination is made that the server is to disable the keyboard of a client, the process passes to block 604 which depicts the server transmitting a packet to the particular client including a command to disable the keyboard. The process then terminates as illustrated at block 618.

Referring again to block 602, if a determination is made that the server is not to disable the keyboard, the process passes to block 606 which illustrates a determination of whether or not the server computer system is to re-enable the keyboard of a particular client on the network. If a determination is made that the server is to re-enable the keyboard of a client, the process passes to block 608 which depicts the server transmitting a packet to the particular client including a command to re-enable the keyboard. The process then terminates as illustrated at block 618.

Referring again to block 606, if a determination is made that the server computer system is to not to re-enable the keyboard of a particular client on the network, the process passes to block 610 which depicts a determination of whether or not the server is to disable the mouse of a particular client. If a determination is made that the server is to disable the mouse, the process passes to block 612 which depicts the server transmitting a packet to the particular client including a command to disable the mouse. The process then terminates as illustrated at block 618.

Referring again to block 610, if a determination is made that the server computer system is not to disable the mouse, the process passes to block 614 which illustrates a determination of whether or not the server computer system is to re-enable the mouse of a particular client on the network. If a determination is made that the server is to re-enable the mouse of a client, the process passes to block 616 which depicts the server transmitting a packet to the particular client including a command to re-enable the mouse. The process then terminates as illustrated at block 618. Referring again to block 614, if a determination is made that the server is not to re-enable the mouse of a client, the process passes to block 618.

While a preferred embodiment has been particularly shown and described, it will be understood by those skilled in the art that various changes in form and detail may be made therein without departing from the spirit and scope of the present invention.

What is claimed is:

1. A method in a data processing system for permitting a server computer to remotely disable an input device included within an independently operating client computer system, said client computer system being coupled to said server computer system utilizing a network, said method comprising the steps of:

said server computer system transmitting a message to said independently operating client computer system to disable said input device; and in response to a receipt of said message, a network adapter included within said client computer system disabling said input device by prohibiting a data stream output by said input device from being received by an input/output controller included within said client computer system by grounding said data stream output by said input device such that a user at said client computer system is prohibited from operating said client computer system while said input device is disabled.

2. The method according to claim 1, further comprising the steps of:

said server computer system transmitting a message to said client computer system to re-enable said input device; and in response to a receipt of said message, said network adapter re-enabling said input device by ceasing grounding said data stream output by said input device, wherein said data stream is received by said input/output controller.

3. The method according to claim 2, further comprising the step of said network adapter disabling said input device by grounding said data stream output by said input device utilizing a current sink.

4. The method according to claim 3, further comprising the step of a service processor included within said network adapter disabling said input device by prohibiting said data stream output by said input device from being received by said input/output controller included within said client computer system.

5. A data processing system for permitting a server computer to remotely disable an input device included within an independently operating client computer system, said client computer system being coupled to said server computer system utilizing a network, comprising:

said server computer system executing code for transmitting a message to said independently operating client computer system to disable said input device; and in response to a receipt of said message, a network adapter included within said client computer system disabling said input device by prohibiting a data stream output by said input device from being received by an input/output controller included within said client computer system by grounding said data stream output by said input device such that a user at said client computer system is prohibited from operating said client computer system while said input device is disabled.

6. The system according to claim 5, further comprising:

said server computer system executing code for transmitting a message to said client computer system to re-enable said input device; and in response to a receipt of said message, said network adapter re-enabling said input device by ceasing grounding said data stream output by said input device, wherein said data stream is received by said input/output controller.

7. The system according to claim 6, further comprising said network adapter disabling said input device by grounding said data stream output by said input device utilizing a current sink.

8. The system according to claim 7, further comprising a service processor included within said network adapter disabling said input device by prohibiting said data stream output by said input device from being received by said input/output controller included within said client computer system.

9. A data processing system for permitting a server computer to remotely disable an input device included within an independently operating client computer system, said client computer system being coupled to said server computer system utilizing a network, comprising:

said server computer system executing code for transmitting a message to said independently operating client computer system to disable said input device;

in response to a receipt of said message, a service processor included within a network adapter included within said client computer system disabling said input device by grounding a data stream output by said input device utilizing a current sink, said data stream being prohibited from being received by an input/output controller included within said client computer system;

said server computer system executing code for transmitting a message to said client computer system to re-enable said input device; and in response to a receipt of said message to re-enable, said service processor re-enabling said input device by ceasing grounding said data stream output by said input device, wherein said data stream is received by said input/output controller.

* * * * *